3,174,865
PROCESS FOR PREPARING A FRUIT AND
MILK BEVERAGE
Woody S. Johnston, Ida Johnston, Jerome F. Gebhardt, and Marcolla S. Gebhardt, all of Ashland, Oreg., assignors to Tom Tom Beverage Co., Medford, Oreg., a corporation of Oregon
No Drawing. Filed Oct. 30, 1961, Ser. No. 148,746
1 Claim. (Cl. 99—54)

This application is a continuation-in-part of application Serial No. 858,852, filed December 11, 1959, now abandoned.

This invention relates to a novel beverage comprising a combination of fruit and milk. More particularly the invention provides a novel method effecting the combination of a fruit nectar with dairy products in a manner not heretofore possible.

Many attempts have been made in the past to provide a beverage containing the health giving qualities of both fruit and milk but such attempts have been unsuccessful or have resulted in a beverage which is either unpalatable or which is not capable of being preserved.

The main object of the present invention is therefore the provision of a method of combining fruit and dairy products to make a palatable beverage which may be preserved indefinitely by conventional canning or bottling processes.

Another object of the invention is the provision of a method of combining a fruit such as pear with milk having a relatively high butterfat content without permitting the milk to curdle.

Still another object of the invention is the provision of a beverage containing a relatively high percentage of pear pulp thus providing a means for employing pear culls which would otherwise be discarded.

Yet another object of the invention is the provision of a fruit flavored beverage containing a relatively large percentage of pear nectar but which does not have a noticeable pear taste.

Other objects and advantages will be apparent from the following specification.

Although the present invention lends itself to use with various kinds of fruit and berries, it is particularly valuable when pear is employed as a base because pear growers have heretofore been unable to dispose of pear culls in any manner that would provide reasonable revenue.

In general the invention may be carried out by combining fruit nectar with milk as set forth in the following example of one specific form of the invention:

To 58 gallons of pear concentrate, 24% solids, and 29 gallons of peach concentrate, 24% solids, add 50 gallons of sugar syrup and ascorbic acid or citric acid as necessary to obtain a pH of about 5.

Mix the following:

110⅔ lbs. sugar
58.8 lbs. milk powder
33⅓ lbs. corn syrup
1.83 lbs. stabilizer such as gelatin
4 oz. egg yolk color
30 oz. pure vanilla extract The above milk mix will be recognized as that conventionally employed for making ice cream and which is usually homogenized prior to freezing.

By the present invention, and following the above specific example the "ice cream" mix is homogenized and about 97.5 gallons of the same is then added to the above noted 137 gallons of sweetened fruit nectar. The combined materials are then aerated for about 30 seconds by blending in a high speed mixer and the beverage is ready for canning.

The canning step preferably is carried out by preheating the mixture and then flash pasteurizing at from 200° to 295° F. for about 50 seconds. The mixture is then cooled and canned.

When the beverage is subsequently removed from the container, it is preferably aerated again and served chilled.

It will be understood that the above very specific formula is merely given as a preferred form of the invention which has been found to provide an extremely tasty beverage. No claim is made to the various ingredients of the ice cream mix since such ingredients are obviously present merely to provide a desirable taste and texture.

An important step in the invention is that of combining the fruit nectar with the milk and it makes little difference what ingredients, if any, are added to the milk prior to combining it with the fruit nectar.

As will be readily understood the danger in combining the fruit nectar with the milk is that the milk is likely to curdle. This danger is obviated in the present invention by adjusting the pH ratio to between 3.5 and 5.0 and, more important, aerating the mixture prior to canning. If the aerating step is omitted curdling of the milk results regardless of the care taken in adjusting the pH ratio.

The fact that the above described beverage may be stored for a long period of time without settling or curdling is attributable in part to the presence of finely comminuted fibers of pear dispersed throughout the mixture as a result of the aerating or blending step. The lightweight pear fibers have little tendency to settle and therefore contribute to the suspension of the other particles of the mixture to prevent settling or curdling.

The invention provides a useful method of using pear pulp so that the pear taste is almost entirely lost in the resulting beverage.

The butterfat content of the milk in the above example is, of course, high but such richness is merely to give the resulting beverage a desirable texture and taste. It will be apparent that a milk of a lower butterfat content may be employed since the only difference would be in the taste and food value of the beverage.

It will be noted that the amount of pear in the above formula is twice the amount of peach. However, surprisingly enough, the pear taste is masked and is scarcely discernable whereas the peach taste is dominant.

This same result, that is the masking of the pear taste without removal of the beneficial food values of the pear, may be achieved with other fruits such as, for example, grape, pineapple and orange.

The above noted formula for pear and peach may be altered when a grape flavor is desired by substituting 20 gallons of grape (47 Brix) and 45 gallons of sugar syrup for the peach and sugar given in the above example.

In the case of a pineapple flavored drink 24.5 gallons of pineapple (61 Brix) and 45.5 gallons of liquid sugar are used in lieu of the corresponding amounts of peach and sugar given above.

An orange flavored drink may be achieved by employing 26 gallons peeled orange (60 Brix) and 45.5 gallons liquid sugar in lieu of the amounts of peach and sugar given in the first example.

In all cases the amounts of sugar added result in a fruit solution having an 18 Brix reading.

It will be understood that in all four of the above examples the fruits are very finely divided by the high speed blending step so that the resulting beverage is in the form of a thick juice.

It should be understood that the pear and peach given in the first example are based on pear pulp and peach pulp of the same concentrates of 24%. If comparison is made on the basis of the natural fruit juice, it would be found that the ratio of pear to peach is less than the two to one ratio given above. However, since concentrates in the form of pulp are used for convenience by most canneries, the above described proportions are practical.

Similarly, the proportions of pear to grape, pineapple and orange respectively would differ from the above noted proportions if the respective fruits are compared in their natural unconcentrated condition. However, it will be understood in each instance pear comprises a substantial portion of the mixture.

The above specific examples given of the preferred embodiments of the invention should not be taken as restrictive since it will be apparent that deviations may be resorted to without departing from the scope of the appended claim. Furthermore, it will be understood that the exact characteristic of fruit varies from one location to another.

We claim:

A process for preparing a fruit and milk beverage product having the capability of being stored for relatively long periods of time without settling and without sensible curdling, said process comprising the steps of forming a mixture of milk, pear pulp, and pulp of a fruit selected from the group consisting of peach, grape, pineapple, and orange, the amount of pear pulp being sufficient to inhibit sensible curdling of the milk constituent of the mixture, the amount of said selected fruit being sufficient to impart to said fruit and milk beverage product the flavor quality of said selected fruit, adjusting the pH of said mixture to approximately 3.5–5.0, and converting said mixture to a substantially homogeneous condition while comminuting said pear pulp to a finely divided form.

References Cited by the Examiner
UNITED STATES PATENTS 2,055,782  9/36  Baier _____ 99—105
2,818,342  12/57  Ransom _____ 99—105

OTHER REFERENCES

Guess et al.: Circular 331, University of California College of Agriculture Agricultural Experiment Station, Berkeley, Calif., December 1933, pp. 18, 19 and 30 relied on.

A. LOUIS MONACELL, *Primary Examiner.*

TOBIAS E. LEVOW, WILLIAM B. KNIGHT,
*Examiners.*